United States Patent
Yazdani et al.

(10) Patent No.: US 12,371,062 B1
(45) Date of Patent: Jul. 29, 2025

(54) METHOD AND SYSTEM FOR AUTONOMOUS VEHICLE CONTROL

(71) Applicant: Gatik AI Inc., Mountain View, CA (US)

(72) Inventors: Amir Yazdani, Mountain View, CA (US); Apeksha Kumavat, Mountain View, CA (US); Gautam Narang, Mountain View, CA (US); Arjun Narang, Mountain View, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 18/975,198

(22) Filed: Dec. 10, 2024

(51) Int. Cl.
*B60W 60/00* (2020.01)
*B60W 50/00* (2006.01)

(52) U.S. Cl.
CPC .... *B60W 60/0015* (2020.02); *B60W 50/0097* (2013.01); *B60W 2050/0028* (2013.01)

(58) Field of Classification Search
CPC ........ B60W 60/0015; B60W 60/0097; B60W 2050/0028
See application file for complete search history.

(56) References Cited

U.S. PATENT DOCUMENTS

| | | | |
|---|---|---|---|
| 10,096,038 B2 * | 10/2018 | Ramirez | G06Q 50/40 |
| 11,409,304 B1 * | 8/2022 | Cai | B60R 1/00 |
| 11,441,916 B1 * | 9/2022 | Konrardy | G01C 21/343 |
| 2022/0185267 A1 * | 6/2022 | Beller | B60W 30/0956 |
| 2024/0127470 A1 * | 4/2024 | Park | G01S 17/931 |
| 2024/0208533 A1 * | 6/2024 | Cao | B60W 60/001 |

\* cited by examiner

*Primary Examiner* — Wade Miles
*Assistant Examiner* — Zachary Joseph Wallace
(74) *Attorney, Agent, or Firm* — Jeffrey Schox; Diana Lin

(57) ABSTRACT

A method for determining scene risk for an autonomous vehicle includes receiving scene data, predicting risk scores using a trained risk prediction model, determining an appropriate autonomous vehicle behavior based on these risk scores, and controlling the vehicle accordingly. In some implementations, the method includes training the risk prediction model by generating initial risk scores from a labeled training dataset, learning an intermediate model from these scores, and training the risk prediction model using multimodal training data and secondary risk scores.

20 Claims, 9 Drawing Sheets

METHOD AND SYSTEM FOR AUTONOMOUS VEHICLE CONTROL

TECHNICAL FIELD

This invention relates generally to the autonomous vehicle field, and more specifically to a new and useful system and method for generating a large risk prediction model in the autonomous vehicle field.

DETAILED DESCRIPTION

The following description of the embodiments of the invention is not intended to limit the invention to these embodiments, but rather to enable any person skilled in the art to make and use this invention.

1. Overview

Figure 1:
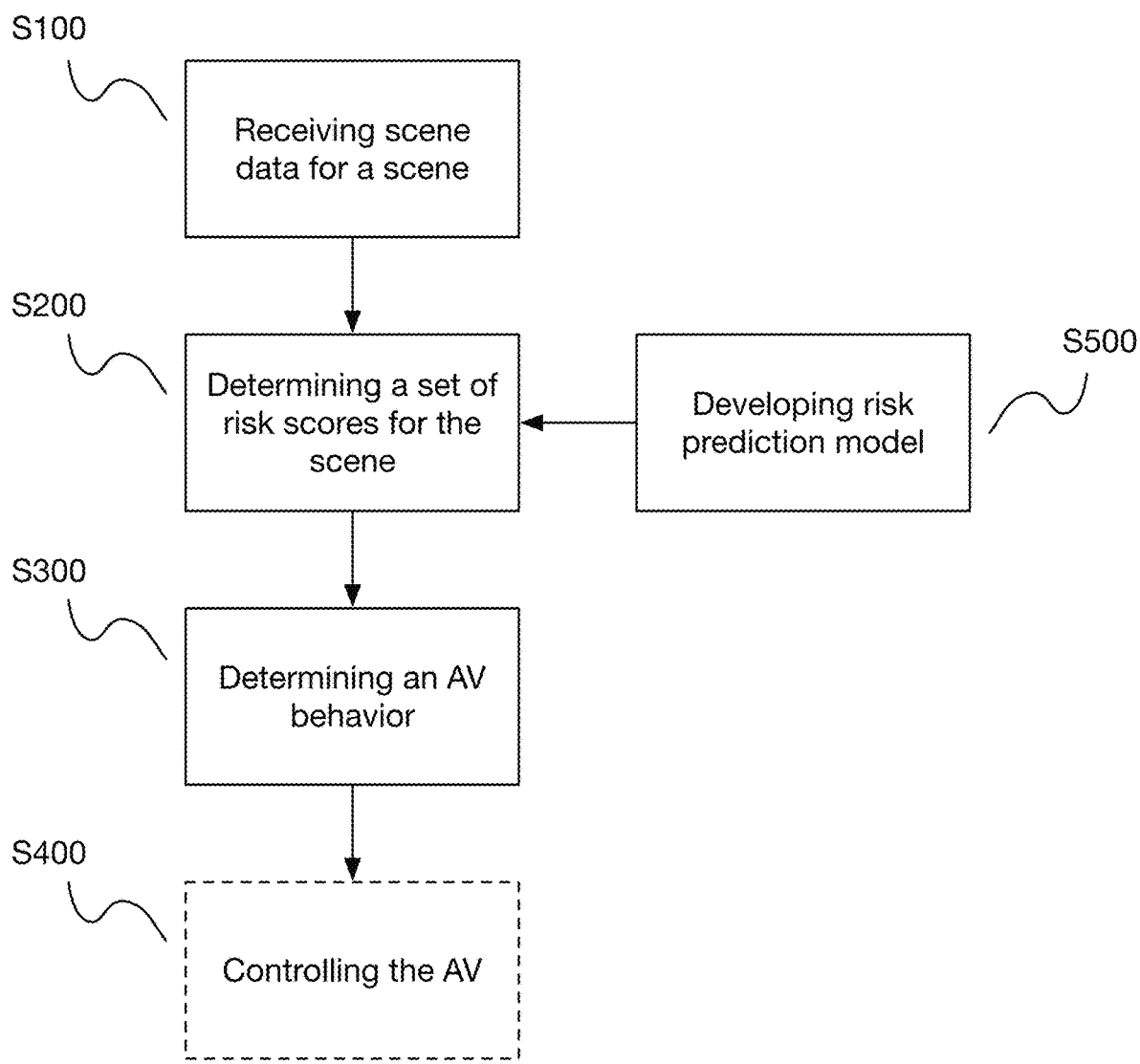
FIG. 1 is a schematic representation of a variant of an autonomous vehicle scene risk assessment method.

As shown in FIG. 1, the method can include: receiving scene data for a scene S100; determining a set of risk scores for the scene S200 using a trained risk prediction model; determining autonomous vehicle behavior S300 based on the set of risk scores; and controlling the autonomous vehicle S400 based on the autonomous vehicle behavior. The method functions to determine the risk of a scene ("scene risk").

Figure 2:
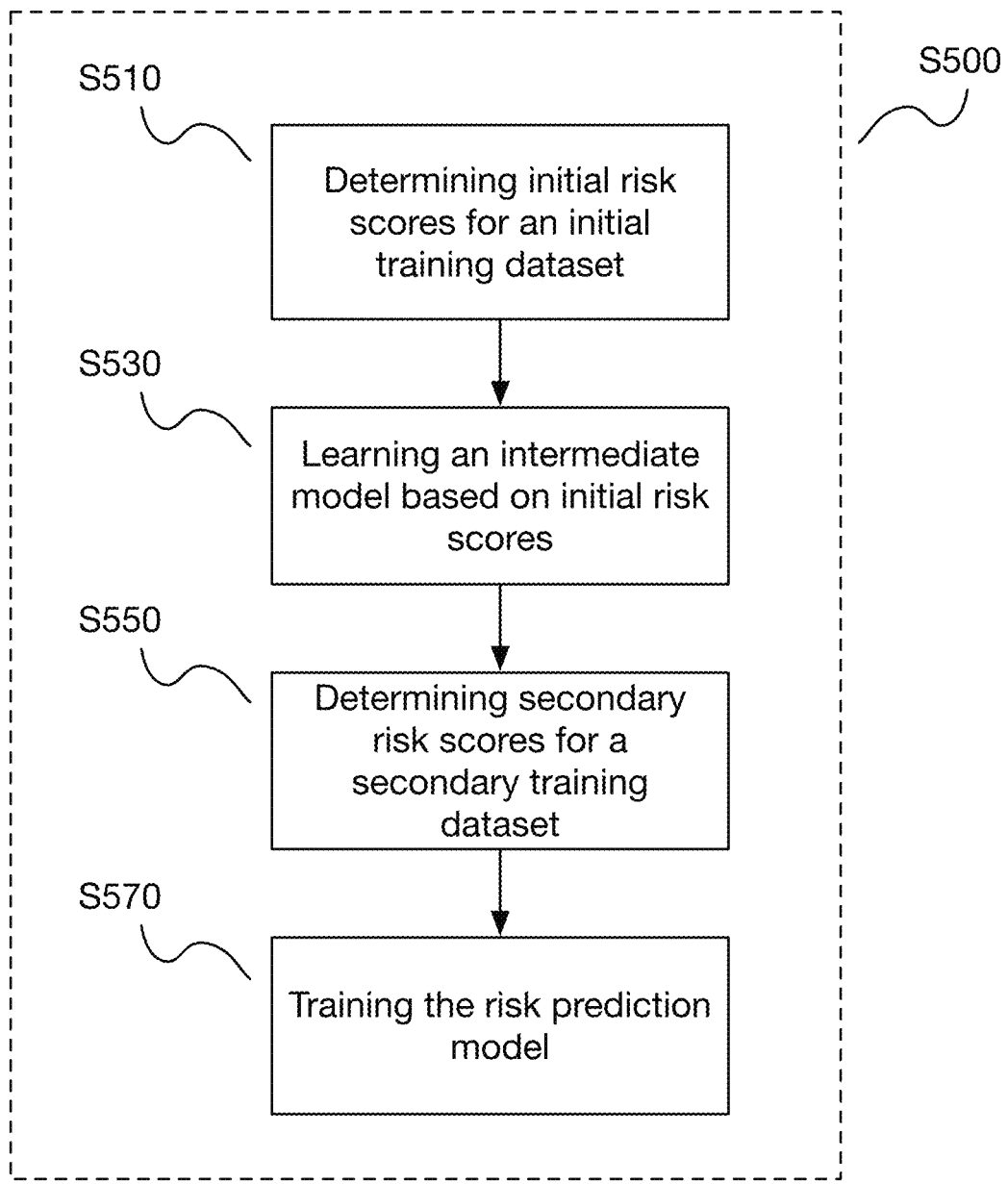
FIG. 2 is a schematic representation of a variant of developing the risk prediction model.

In variants, the method can include training the risk prediction model S500, which can include: determining an initial set of risk scores for a set of initial training data S510; learning an intermediate model based on the initial set of risk scores S530; determining secondary risk scores for each of a plurality of multimodal datasets S550; and training the risk prediction model using the multimodal training data and the secondary set of risk scores S570, an example is shown in FIG. 2. In variants, this can enable the system to train a large risk prediction model (e.g., with self-attention layers, etc.) that can capture long-range dependencies, handle complex and multimodal data, handle time series, dynamically focus on relevant information, improved generalization to complex contexts (e.g., able to predict a risk score for scenes outside of the training dataset), and/or confer other benefits, while using a relatively limited set of labeled training data.

Figure 4:
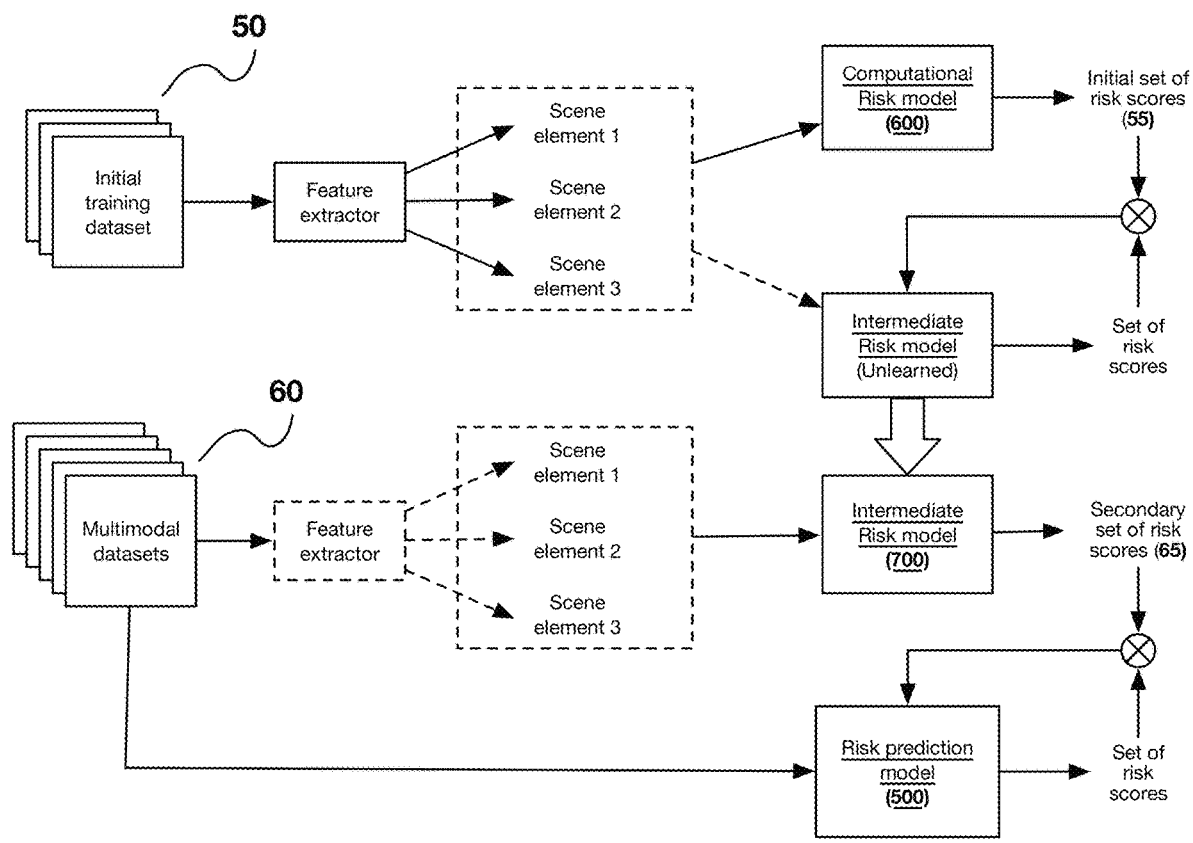
FIG. 4 is a schematic representation of a variant of training the risk prediction model.

In an illustrative example, the method can include: labeling an initial training dataset with risk scores using numerical methods and/or physics-based computational models (e.g., using different risk models for each element type); training a differentiable model (e.g., fully connected feed-forward networks, classical models, etc.) using the initial training dataset as training inputs and the risk scores as training targets; labeling a secondary training dataset with secondary risk scores using the differentiable model; and training a risk prediction model (e.g., a transformer, etc.) using at least the secondary training dataset as the training inputs and the secondary risk scores as the training targets (e.g., and optionally training the risk prediction model based on the initial training data, initial risk score pairs). An example is shown in FIG. 4. The resultant risk prediction model can be used during autonomous vehicle operation, where the trained risk prediction model can predict the scene risk (e.g., complete scene risk scores, scene-agent risk scores, etc.) based on sampled data. The autonomous vehicle can then determine (e.g., predict) an autonomous vehicle behavior in light of the scene risk.

2. Technical Advantages

Variants of the technology can confer one or more advantages over conventional technologies.

First, in some variations, the technology can enable large transformer models to be used for AV operation. In specific examples, the system and method use a machine learning model to interpret multimodal data of a scene, which may be extensive, variable, and diverse, and is able to process this data into simple interpretation that is then utilized for controlling an autonomous vehicle. Processing extensive, variable, and diverse datasets can be difficult to derive accurate insights from. Large datasets often demand significant computational power and storage, posing scalability issues. They may also be time consuming to process. Neural networks are well-suited for handling complex patterns in large datasets and learning nuanced relationships within the data. By leveraging the inherent flexibility and adaptability of neural networks, the system can efficiently process and interpret multimodal information, making it possible to generate reliable, actionable outputs essential for the safe and accurate control of autonomous vehicles Second, in some variations, the system and/or method enables large models (e.g., transformer models) to be trained using limited amounts of data. Data collection can be difficult and time consuming. Additionally, processing and labeling large amounts of data (which can include feature extraction, manual labeling, and/or extensive model) can be time intensive and computationally intensive, making it challenging to develop models that are adept for handling diverse input. The system and method teaches a process for leveraging minimal amounts of select data (for example, a small dataset or data of a single modality) to train a model that can receive, as input, diverse data and can accurately label scene risks. In some variations, this is achieved by using computational models to label limited amounts of data, then learning a bootstrapped model from this small dataset. This bootstrapped model may then be used to determine risk scores for large volumes of data required for training a transformer-based model (e.g., model with self-attention layers).

Third, in some variations, this transformer-based model does not require extracted features from raw data as input.

Instead, the DNN can directly receive the raw data, bypassing explicit scene element information extraction. This reduces processing steps and can further enable scene risk to be predicted in real- or near-real time during vehicle operation (e.g., without waiting for scene element extraction, risk scoring, and aggregation), which can enable behavior models to ingest risk as an additional attribute for better (e.g., safer) behavior selection. However, further advantages can be provided by the system and method disclosed herein.

4. Method

In variants, the method can include: receiving scene data for a scene S100; determining a set of risk scores for the scene S200 using a trained risk prediction model; determining autonomous vehicle behavior S300 based on the set of risk scores; and controlling the autonomous vehicle S400 based on the autonomous vehicle behavior, as shown in FIG. 1. In variants, the method can include training the risk prediction model S500, which can include: determining an initial set of risk scores for a set of initial training data S510; learning an intermediate model based on the initial set of risk scores S530; determining secondary risk scores for each of a plurality of multimodal datasets S550; and training the risk prediction model using the multimodal training data and the secondary set of risk scores S570, as shown in FIG. 2.

The method functions to determine the risk of a scene ("scene risk"). The scene risk can be used to inform the behavioral model 300 of an autonomous vehicle 10 so that the autonomous vehicle acts in a manner that is congruent to the risk level of the scene. In an example, a behavioral model 300 can determine the vehicle behavior and/or action 25 based on the predicted scene risk.

Figure 3:
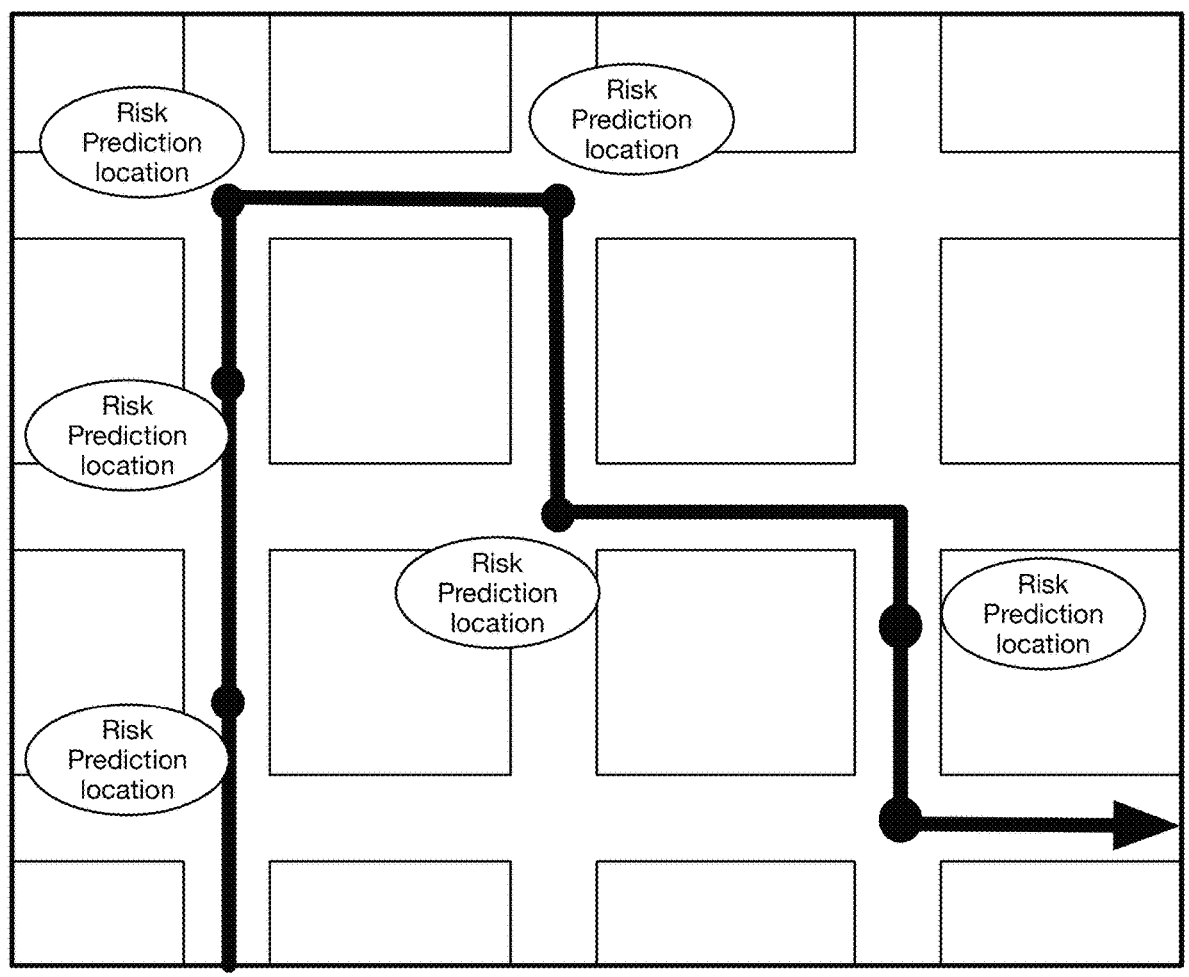
FIG. 3 is an illustrative example of a map of an autonomous vehicle route, indicating locations at which a risk prediction may be made.

The method can be performed during vehicle operation (e.g., while driving) periodically, when the scene is changed, at new locations, when new elements are introduced to scene (e.g., pedestrians, vehicles, collisions, etc.), at a predetermined location (e.g., geographic locations with known high risks, geographic locations with highly variable risks), and/or at any other suitable time. An example is shown in FIG. 3. The method can be performed by the autonomous vehicle 10, a remote computing system, and/or any other suitable system.

The method can be used with one or more autonomous vehicles 10. An autonomous vehicle 10 can be a self-driving vehicle capable of navigating various environments and making real-time decisions based on sensor measurements of the environment. The autonomous vehicle 10 functions to autonomously operate within a real-world scene.

The autonomous vehicle 10 can include one or more sensor sets. The sensor set includes one or more sensors having one or more sensing modality. Examples of sensors can include cameras, microphones, lidar, radar, ultrasound, and/or any other suitable autonomous vehicle sensors.

The autonomous vehicle 10 can include one or more processing systems. The processing system can be onboard or local to the vehicle, or alternatively remote from the vehicle, and/or any other suitable location. The processing system executes the risk model, the behavior model, and/or other model.

The method can be used with one or more scenes. A scene is preferably a real-world scene, but can alternatively be a synthetic scene, and/or any other suitable scene. In an example, the scene can be a road, parking lot, highway, intersection, bridge, and/or any other suitable location.

The scene can be associated with a geolocation, or be geolocation agnostic. The geolocation can be: the location of an autonomous vehicle, or alternatively a future location along the autonomous vehicle's trajectory. The geolocation is preferably along a fixed route, but can alternatively be along any route. The scene can be associated with a timestamp, or alternatively not associated with a timestamp, and/or any other suitable temporal information.

The scene can include one or more scene elements. Scene elements can include static elements, dynamic elements, and/or any other suitable elements.

Static elements can be immobile elements that are static relative to the scene, and/or any other suitable static elements. Static elements can collectively define a static scene. Examples of static elements can include lanelet, lane, traffic control (e.g., traffic light, stop sign, railroad cross guard, etc.), sidewalks, signs, barriers (e.g., fences, etc.), and/or any other suitable static elements.

Dynamic elements can be mobile elements that can be dynamic relative to the scene, transient elements, and/or any other suitable dynamic elements. Dynamic elements can collectively define a driving context with the static scene elements. Examples of dynamic elements can include vehicles (e.g., moving, parked), pedestrians, bicycles, animals, and/or any other suitable dynamic elements.

Each scene element can be associated with one or more attributes (e.g., element attributes). A set of element attributes for a given element can collectively form an element state. Element attributes within the state can be specific to the type of scene element or generic. Element attributes can be extracted (e.g., by a dedicated feature extractor, classifier, etc.), predicted, retrieved (e.g., from a map, from historical data for the element, etc.), and/or otherwise determined. Examples of element attributes within a state can include traffic light color, lanelet occupancy, vehicle kinematics (e.g., velocity, acceleration, heading, etc.), static or dynamic classification, and/or any other suitable attributes.

The scene can include: a specific combination of scene elements with the respective element states, a specific combination of scene elements (e.g., irrespective of element state), specific combination of static elements, and/or any other suitable combination. The scene can be associated with a specific sensor perspective (e.g., angle of view), or alternatively be perspective agnostic, and/or have any other suitable perspective characteristics.

Receiving scene data for a scene S100 functions to obtain data about the current driving context. S100 can be performed by the onboard processing system, but can alternatively be performed by a remote computing system, and/or any other suitable system. S100 can be performed at a predetermined frequency, when scene data is collected or measured, when scene data changes from scene data that had been previously analyzed, periodically during vehicle operation, randomly, when scene changes are detected, and/or at any other time.

The sensor data 15 can be received from an AV sensor set, a leading AV (e.g., ahead of the ego vehicle along a route), environmental sensors (e.g., roadside cameras), and/or any other suitable source.

The scene data 15 can be unimodal or multimodal, but can alternatively be other suitable types. In an example, modalities can include image, video, text, audio, measurements, and/or any other suitable modality. The scene data 15 that can be received can include image data, video data, audio data, depth measurement, distance measurements, velocity measurements, and/or any other suitable data. The scene data 15 can be stored scene data 15, recently collected scene data, real-time scene data, and/or any other suitable type of scene data. Different pieces of scene data 15 (e.g., sampled at different times) can have different modality compositions. In an example, the scene data can include images and audio at a first timeframe, but include only lidar at a second timeframe. The scene data 15 can include all sampled scene data, a subset of the scene data (e.g., scene data 15 having a threshold accuracy score, confidence score, stability score, etc.), and/or any other suitable scene data.

However, S100 may be otherwise performed.

Determining a set of risk scores for the scene S200 functions to assess a scene of a potential risk level to inform an autonomous vehicle on its behavior. The set of risk scores 20 can be determined by the onboard processing system, but can alternatively be determined by a remote processing system, and/or any other suitable system. S200 can be performed: locally (e.g., onboard the AV), remotely by a remote computing system (e.g., wherein the scene data is sent to the remote computing system for analysis), and/or by any other suitable system.

S200 can be performed when scene data is received, after a driving session, and/or at any other suitable time. The risk score can be predicted, inferred, looked up, estimated, and/or determined in any other suitable manner.

The scene risk score 20 functions to describe a risk level of a scene. The scene risk score 20 can be a quantitative value or qualitative label (e.g. high risk, medium risk, low risk, etc.). The scene risk score 20 can be continuous, discrete, binary, and/or any other suitable type.

Figure 5:
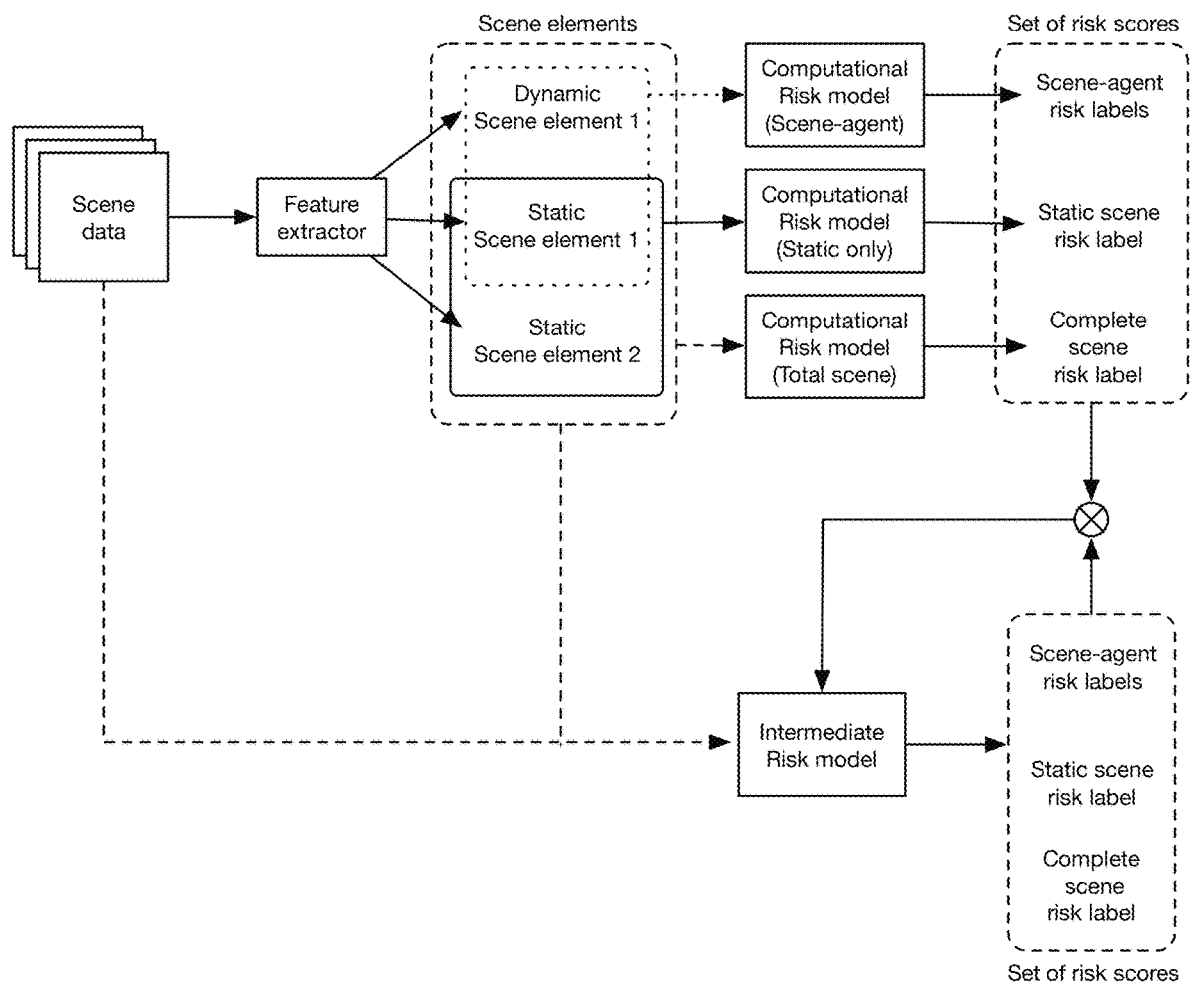
FIG. 5 is a schematic representation of a variant of training an intermediate risk model to predict a set of different risk scores associated with varying scene elements.

The scene risk scores can include static scene risk scores, complete scene risk scores, scene-agent risk scores, and/or other risk scores. An example is shown in FIG. 5. Static scene risk scores can be risk scores that describe risk associated with stationary or permanent scene elements (e.g. roads, sidewalks, buildings, road signs, etc.), and can be time-independent. Complete scene risk scores (e.g., contextual risk score, scene-centric risk, etc.) can be risk scores that describe the risk associated with the complete scene at a specific time, encompassing both stationary and permanent scene elements and dynamic elements which change with time (e.g. cars, pedestrians, traffic, weather, etc.). Scene-agent risk scores (e.g., agent centric risk) can be risk scores associated with a relationship between a first and second element. For example, a scene-agent risk score can include the risk imposed by a dynamic element (e.g., AV, car, pedestrian, etc.) on a second element, where the second element can be static (e.g., building, road barrier, street pole, pothole, etc.) or dynamic (e.g. pedestrian, road, traffic). In a specific example, the scene-agent risk score can include the risk imposed by an element (e.g., dynamic or static element) on the ego vehicle.

Figure 6:
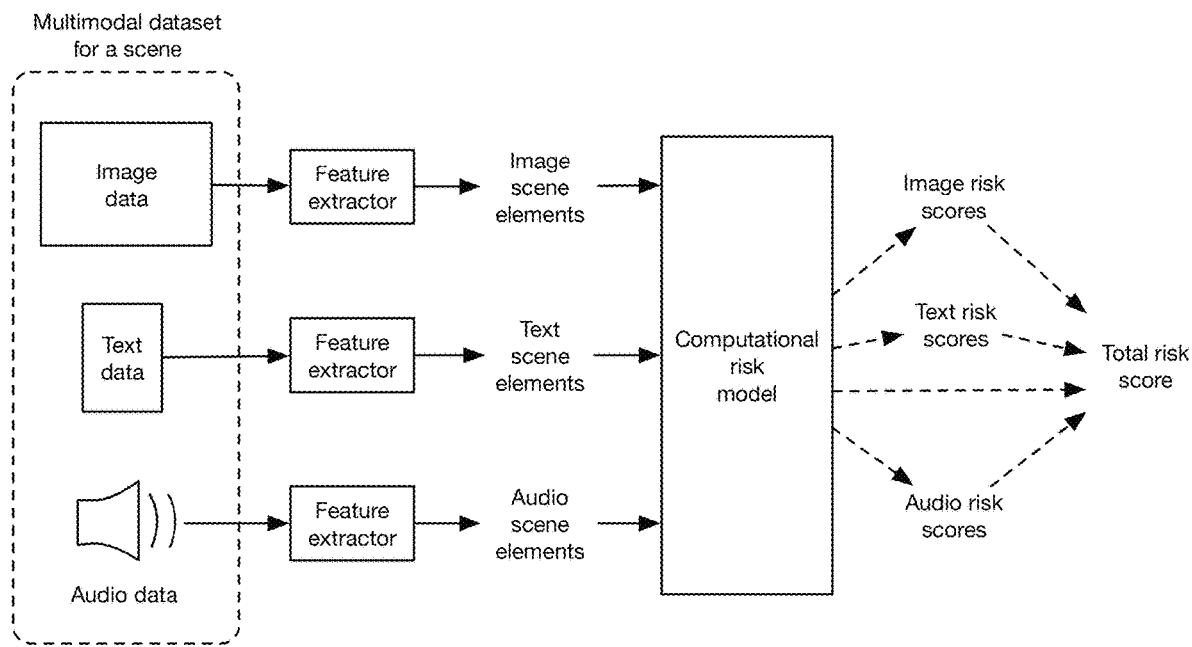
FIG. 6 is a schematic representation of an example of processing scene data for determining a set of different risk scores associated with different data modalities.

The risk scores can be determined from one modality or multiple modalities (e.g., example shown in FIG. 6). Risk scores determined from different modalities for the same scene can be averaged, aggregated using a voting mechanism, and/or otherwise combined. In variants, a complete scene risk score can be determined from all modalities without determination of modality-specific risk scores (e.g., example shown in FIG. 6).

The risk score is preferably predicted based on scene data using a risk prediction model 500, but can alternatively be calculated (e.g., using numerical methods based on elements and/or element states extracted from the scene data), and/or determined in any other suitable manner.

The determined risk score 20 can be for: the sampling timestep (e.g., the scene data sampling time), next timestep, future timestep, and/or any other suitable timestep.

The risk prediction model 500 functions to predict risk from scene data. The risk prediction model 500 can predict a set of risk scores 20, a single type of risk score (e.g., static scene risk score, complete scene risk score, scene-agent risk score, etc.), confidence scores (e.g., for each risk score, etc.), and/or any other suitable information.

The risk prediction model 500 can predict the set of risk scores based on scene data. The risk prediction model 500 can be unimodal, multimodal (e.g., support multiple modalities, such as image, audio, video, text, etc.), and/or support any other suitable number of modalities. The risk prediction model 500 can be specific to a predetermined set of sensing modes, alternatively not specific to a sensing mode, and/or configured in other suitable ways.

In a first example, the risk score is predicted by directly providing the scene data to an input layer of a risk prediction model (e.g., without explicitly extracting scene elements or scene element states).

In a second example, the risk score is predicted by extracting scene elements and/or states from the scene data using a set of extraction models, wherein the scene elements and/or states are provided to the input layer of the risk prediction model.

In a third example, the risk score is predicted by looking up the risk scores (e.g., based on the extracted features, the geolocation, etc.).

However, the risk score can be otherwise determined.

The risk prediction model 500 is preferably a non-differentiable model, but can alternatively be a differentiable model. The risk prediction model 500 is preferably a transformer model, but can additionally and/or alternatively be a multi-layer perceptron, deep neural network, a recurrent neural network, a convolutional neural network, a graph neural network, a decision tree, a random forest, a support vector machine, or any other suitable non-differentiable neural network. The risk prediction model 500 can be quantized or otherwise reduced in size when deployed to the vehicle.

The risk prediction model 500 preferably executes onboard the autonomous vehicle, but can alternatively execute on a remote computing system. The risk prediction model 500 preferably runs in real- or near-real time, but can alternatively run asynchronously from sensor data sampling and/or vehicle operation.

The risk prediction model 500 can be trained to predict risk S500 or untrained (e.g., instructed to predict risk using zero-shot or few-shot training).

Training the risk prediction model S500 can include: determining initial set of risk scores for an initial training dataset S510, learning an intermediate model based on the initial set of risk scores S530, determining secondary set of risk scores for a secondary training dataset S550, training the risk prediction model S570, and/or any other suitable substeps. Training the risk prediction model S500 functions to train a large, attention-based model that can predict a set of risk scores given a scene. The risk prediction model can be trained by a remote computing system (e.g., a platform), and/or any other suitable remote computing system.

The risk prediction model can be trained when new training data is collected, at a predetermined time interval, when model inaccuracies are determined, when model predictions are determined to be inaccurate, when new data modalities are determined, when training data is determined to be different from present-day scene data, for each new scene (e.g., new location, new scene type, new scene complexity, etc.), and/or at any other suitable time.

In variants, S500 can include: determining an initial set of risk scores for a set of initial training data S510; learning an intermediate model based on the initial set of risk scores S530; determining secondary risk scores for each of a plurality of multimodal datasets S550; and training the risk prediction model using the multimodal training data and the secondary set of risk scores S570.

In an example, S500 can include: labeling an initial training dataset with risk scores using numerical methods (e.g., using different risk models for each element type, etc.); training a differentiable model using the initial training dataset as training inputs and the risk scores as training targets; labeling a secondary training dataset with secondary risk scores using the differentiable model; and training the risk prediction model using the secondary training dataset as the training inputs and the secondary risk scores as the training targets. Training the risk prediction model can leverage tokenization, attention mechanisms, RL feedback (e.g., reinforcement learning human feedback, reinforcement learning AI feedback, etc.), and/or other methods. The differentiable model preferably includes differentiable operations, but can additionally and/or alternatively be other suitable operations, which can enable optimization using gradient-based methods (e.g., stochastic gradient descent, etc.), and can include a fully connected feedforward networks, classical models (e.g., linear regression, logistic regression, and/or any other suitable classical models), and/or other models. The risk prediction model can be a non-differentiable model (e.g., with non-differentiable functions and/or models prone to vanishing or exploding gradients, such as thresholded step functions, decision trees, etc.), a transformer, a VLM, an LLM, a multimodal language model, a model with self-attention layers, a model without convolutional layers, a model without recurrent layers, and/or any other model. The risk prediction model preferably has substantially more parameters than the differentiable model (e.g., orders of magnitude more), but can have any other number of parameters. The scale of the initial training dataset can be substantially smaller than the secondary training dataset (e.g., orders of magnitude smaller). The modality diversity within the initial training dataset can be substantially smaller than the modality diversity within the secondary training dataset, or be approximately the same (e.g., initial training dataset only includes images while the secondary training dataset includes images and other data modalities; initial and secondary training dataset include the same distribution of data modalities, etc.).

Determining an initial set of risk scores for an initial training dataset S510 functions to determine accurate risk score of a scene using numerical methods. The initial set of risk scores for an initial training dataset S510 can be later utilized as training targets for another model, cascade labeling, and/or any other suitable purpose.

The initial set of risk scores can be calculated, computed, looked up, and/or otherwise determined. The initial set of risk scores 55 can be the same types of risk scores as those determined for S200 (e.g., static scene risk score, complete scene risk score, scene-agent risk scores, etc.), but can alternatively be different.

The initial training dataset 50 can include scene data and/or any other suitable data. The initial training dataset 50 can preferably include a plurality of different scenes, but can alternatively include a single scene. In an example, the initial training dataset 50 includes measurements of the same geolocation, but with different dynamic elements. The same scene can be represented by one or more modalities within the initial dataset (e.g., the same scene is represented using an image, audio, video, and 3D point cloud). All or most of the scenes or scene types to be supported by the risk prediction model are preferably represented in the initial training dataset 50, but can alternatively not be represented. The initial training dataset is preferably unlabeled (e.g., with elements, element attributes, risk scores, etc.), but can alternatively be labeled (e.g., with one or more of elements, element attributes, risk scores, etc.).

The initial training dataset 50 can include single sensing modality, multiple sensing modalities, and/or any other suitable number of sensing modalities. The initial training dataset 50 can include all or a subset of the sensing modalities supported by the risk prediction model 500. In a first example, the initial training dataset 50 can only include images, only include videos, only include audio, only include text, and/or any other suitable modality, while the risk prediction model 500 can support videos, images, audio, and/or text. In a second example, the initial training dataset 50 can exclude human-unintelligible modalities (e.g., WiFi signals).

The initial training data preferably includes single frames, but can additionally and/or alternatively include a time series of frames, and/or any other suitable data format.

The initial training dataset 50 is preferably substantially smaller than the multimodal training dataset used in S550, but can alternatively be comparable. The initial training dataset 50 can be a subset of the multimodal training dataset, but can alternatively be a separate dataset. In a first example, the initial training dataset 50 can be sampled for data modalities that are supported by the feature extractors. In a second example, the initial training dataset 50 can be randomly sampled. In a third example, the initial training dataset 50 can be sampled for data quality (e.g., less than a threshold amount of noise, selected to have a predetermined element distribution, etc.). However, the initial training dataset can be otherwise determined.

S510 can be performed using: scene feature extraction, scene feature classification, model for each scene feature class, summation of scene feature risks, and/or any other suitable method.

In a first variant, the initial set of risk scores can be individually computed for each initial training datum.

Figure 8:
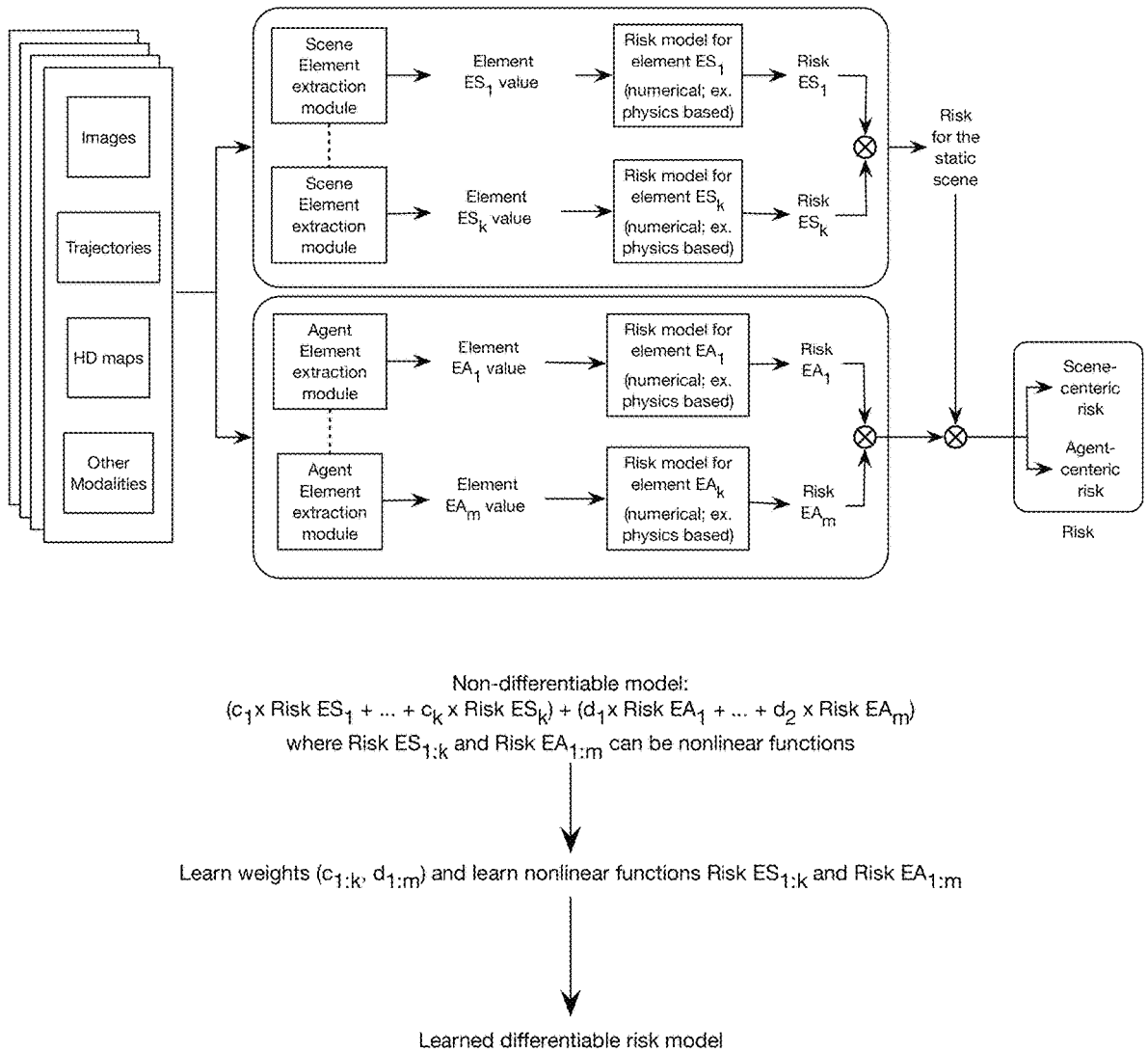
FIG. 8 is a schematic representation of a variant of training a risk prediction model that predicts a set of different risk scores using multimodal data.

In this variant, individually computing the initial set of risk scores can include: extracting scene elements, and optionally the element states, from the initial training datum S512, determining a risk score for each scene element S514, and optionally determining a scene risk score based on the individual element risk scores S516. An example is shown in FIG. 8.

Extracting scene elements from the initial training datum S512 functions to obtain information from the initial training datum. The scene elements (and optionally the element states) can be extracted using a scene element extractor, manually labeled, and/or otherwise extracted.

The scene element extractor can be a classifier, object detector, CNN, transformer, and/or any other suitable scene element extractor.

In an example, S512 can include detecting each of a set of predetermined elements (and optionally the associated element state) within the initial training datum, using a set of classifiers or object detectors.

The extracted scene element information can be in a normalized space (e.g., a shared representation, despite different source data modalities), but can alternatively be un-normalized (e.g., have different representations for different source data modalities, etc.).

However, S512 may be otherwise performed.

Determining a risk score for each scene element S514 functions to calculate or retrieve a risk value associated with each identified element within the scene. S514 can be performed using a set of computational risk models 600 (e.g., numerical risk model), manually performed (e.g., wherein a user assigns a risk score), and/or otherwise performed.

The computational risk models can be deterministic, but can alternatively be probabilistic. The computational risk models are preferably numerical, but can alternatively be analytical. The computational risk models are preferably not neural networks, but can alternatively be neural networks.

The computational risk models can determine the risk for each scene element (e.g., overall risk contribution, risk relative to another element based on the respective features or attributes, etc.). Computational risk models that can be used can include: risk lookup tables, statistical techniques (e.g., based on historical severity and/or frequency of an accident for the specific element instance or the element class), Monte Carlo simulation, stress testing, Bayesian networks, logistic regression, decision trees, cox proportional hazards model, extreme value theory, Markov models, risk scoring models (e.g., attribute-based score assignment), Copula models, stochastic processes, and/or any other suitable models. For example, the computational risk model can compute the historical risk for a given intersection instance, or for intersections with unprotected lefts in general. In another example, the computational risk model can compute the risk of vehicles traveling at a predetermined speed (e.g., on an ego vehicle, on the overall scene, etc.).

Each scene element type can be associated with a different set of computational risk models (e.g., a first model for an intersection, a second model for a pedestrian). Alternatively, all scene element types can use the same computational risk model.

In a first variant, risk scores are predetermined and retrieved for the identified scene element (e.g., for static elements). The risk score can be determined from historic events associated with the scene element, from literature, and/or any other suitable source. In an example, the risk score can be calculated from the historical frequency and severity of accidents for an intersection.

In a second variant, the risk score is computed using a physics-based model (e.g., for dynamic elements). The physics-based model is preferably deterministic, but can alternatively be probabilistic. The physics-based model is preferably numerical, and/or any other suitable type. The physics-based model is preferably specific to the scene element type (e.g., SUV, sedan, motorcycle, bicycle, e-bike, etc.), but can alternatively be generic. Examples of models that can be used include: Monte Carlo simulation, Kalman filtering (e.g., EKF, UKF), Bayesian inference, finite difference methods, hidden Markov models, regressions, and/or any other suitable models. In an example, the risk score for a bicycle is numerically computed using the bicycle's kinematic state relative to the sensor.

In a third variant, risk scores can be determined by comparing extracted scene features to a look-up table containing scene features which have been previously assigned a scene feature risk score.

In a fourth variant, determining a risk score for each scene element S514 can be manually labeled.

However, determining a risk score for each scene element S514 may be otherwise performed.

S510 can optionally include determining a scene risk score based on the individual element risk scores S516, which functions to calculate an overall risk assessment for the entire scene based on the risk scores of individual elements within the scene.

The scene risk score can be determined from the individual element risk scores by using: an average, weighted average, summation, weighted summation, dot product, maximum, and/or any other suitable calculation method. The calculation method can be selected based on the specific requirements of the risk assessment system, the nature of the scene, or any other relevant factors.

In an example, the scene risk score can be calculated as a simple average of all individual element risk scores. In another example, a weighted average can be used, where certain elements are given more importance in the overall risk calculation. In yet another example, the scene risk score can be determined by taking the maximum value among all individual element risk scores, representing the highest risk present in the scene.

The scene risk score determination can be performed at any suitable time during the risk assessment process, such as after the individual element risk scores have been calculated, before determining the autonomous vehicle behavior, and/or at any other time.

However, optionally include determining a scene risk score based on the individual element risk scores S516 may be otherwise performed.

In a second variant, the initial set of risk scores can be determined by manually annotating each initial training datum.

However, S510 may be otherwise performed.

Learning an intermediate model based on the initial set of risk scores S530 functions to train a model that predicts a risk score from features, using the limited initial training dataset 50.

The intermediate model 700 is preferably differentiable, but can alternatively be another model architecture. In variants, a differentiable model provides computational advantages over transformers when working with limited datasets (e.g., initial training dataset 50) by enabling gradient-based optimization through its continuous, derivable nature, allowing for more efficient parameter updates (and therefore smaller training data volumes) compared to transformer models that typically require large amounts of data to train effectively. The differentiable model can leverage prior knowledge and heuristics to initialize parameters in a more informed way, leading to faster convergence with smaller datasets. Additionally, the differentiable model's simpler architecture reduces the number of parameters that need to be learned, making it more suitable for scenarios with data constraints.

In variants, the intermediate model 700 can only handle single frames; alternatively, the intermediate model 700 can handle time series of frames. Examples of the intermediate model 700 that can be used include: a feedforward network, convolutional neural network (CNN), recurrent neural network (RNN), a regression model (e.g., linear regression, logistic regression, etc.), Bayesian model (e.g., Bayesian inference model, gaussian process, latent Dirichlet allocation, etc.), KNN, gaussian mixture models, other model with a differentiable loss function or differentiable operators, and/or any other suitable model.

The intermediate model 700 can be learned by: fitting the model to the data; using optimization; using backpropagation; using gradient descent mechanisms (e.g., stochastic gradient descent), and/or any other suitable learning method. In an example, intermediate model weights are determined through solving the derivative of the loss function (e.g., using gradient descent and/or backpropagation). The intermediate model 700 is preferably trained to predict the initial set of risk scores 55 based on initial training dataset 50, but can additionally and/or alternatively be trained to predict other suitable scores.

In a first variant, S530 can be performed by providing the initial training data 50 as a training input and using the respective risk scores as the training target. The initial training data can be directly provided to the intermediate model's input layers; alternatively, features can be extracted from the initial training data (e.g., using the same or different feature extractors as those used in S510) and provided to the intermediate model's input layers.

In a second variant, the intermediate model is a regression, wherein the risk scores are treated as the dependent variable and the scene element features (e.g., scene elements, element states, etc.) are treated as the independent variables. The coefficients of the regression can then be learned based on the scene element information extracted from the initial training dataset 50 (e.g., from S512, other scene element information, etc.) and associated initial set of risk scores 55, or otherwise learned. Additionally or alternatively, this variant can include optimizing the regression model by experimenting with various permutations of feature weights and hyperparameters to minimize overall prediction error.

In a third variant, the intermediate model can be learned using Bayesian optimization.

However, S530 may be otherwise performed.

Determining a secondary set of risk scores for a secondary training dataset S550 functions to create a large dataset for training the risk prediction model, where the risk score can be used as the training label for each multimodal dataset. In variants, SS50 bootstraps large training dataset generation by using the intermediate model trained in S530, which can subsequently be used to train the final, more flexible risk prediction model.

The secondary set of risk scores 65 can be the same type of the risk scores predicted in S200 and/or S510, but can additionally and/or alternatively be different.

The secondary training dataset 60 can be multimodal and can include at least one of image data, video data, audio data, distance or depth measurement, geometric measurements, velocity measurements, text, and/or any other suitable data; alternatively, the secondary training dataset 60 can include a single modality. The secondary training dataset 60 preferably includes the same modality types as those in the initial training dataset, but can alternatively be different. When the second training dataset includes modality types that are different from the initial training dataset, the new modality types are preferably paired with a modality type represented within the initial training dataset (old modality type) to cooperatively form a multimodal dataset (e.g., secondary training data subset), such that the datum with the new modality type can inherit the risk scores determined for the old modality type. For example, a multimodal dataset can include an image and the new modality, both representing the same scene, wherein the intermediate model is trained to predict a set of risk scores for the image but not the new modality. In this example, the new modality inherits (e.g., is associated with) the risk score determined for the image. The new and old modality measurements of the same scene are preferably contemporaneously sampled (e.g., concurrently sampled), but can be asynchronously sampled.

Secondary training datasets may be collected, measured, recorded, simulated, and/or obtained in any other suitable manner. In an example, a secondary training dataset may be measured from sensors and cameras onboard a vehicle, retrieved from publicly accessible sources, and/or any other suitable source. Multimodal datasets may include image, measurements, written reports, videos of vehicular accidents, images and videos of traffic, synthetic data, and/or any other suitable data.

The secondary training dataset 60 preferably includes the same modality types as those supported by the risk prediction model, but can alternatively be different.

The secondary training dataset can be for the same scene or same geolocation, but can additionally and/or alternatively be for different scenes. Data within the multimodal dataset are preferably sampled from the same perspective of the scene, but can additionally and/or alternatively be from different perspectives. The secondary training dataset is preferably substantially larger than the initial training dataset (e.g., several orders of magnitude), but can alternatively be of comparable size, and/or any other suitable size.

The secondary risk score is preferably determined for each piece of the secondary training data using the trained intermediary model, but can additionally or alternatively be manually determined or otherwise determined.

In a first variant, determining a secondary set of risk scores for a secondary training dataset S550 can include providing the secondary training data to the input layers of the trained intermediary model, wherein the trained intermediary model predicts the set of risk scores.

In a second variant, determining a secondary set of risk scores for a secondary training dataset S550 can include extracting scene element information from a datum of the secondary training dataset (e.g., using the same or different scene element extractors from S530). The datum is preferably from the same sensing modality as the datum in S510 (e.g., an image when S510 calculated risk scores based on images), but can alternatively be different. The second variant can also include determining (e.g., computing) the scene-only risk score using the intermediate model based on the scene element information.

In variants where multiple risk scores are determined from multiple modalities for a given scene, the multiple risk scores can be aggregated (e.g., using a weighted sum based on the modality, etc.) or otherwise managed.

However, determining a secondary set of risk scores for a secondary training dataset S550 may be otherwise performed.

Training the risk prediction model S570 functions to develop a final risk prediction model 500. The risk prediction model 500 preferably includes a self-attention mechanism, but can alternatively include other architectures. Examples of the model architectures that can be used for the risk prediction model 500 can include: a transformer, LLM, VLM, and/or any other suitable non-differentiable model (e.g., model with a non-differentiable loss function, model with non-differentiable functions, model with functions or loss functions that introduce non-differentiable points, etc.). In variants, this can enable the system to develop a risk prediction model 500 that can: capture long-range dependencies, handle complex and multimodal data, handle time series, that can dynamically focus on relevant information, improved generalization to complex contexts (e.g., able to predict a risk score for scenes outside of the training dataset), and/or any other suitable capabilities.

The risk prediction model 500 can be trained on all or a subset of the supported modalities. The risk prediction model 500 can be trained on the raw secondary training data 60 (e.g., without feature extraction), trained on features extracted from the secondary training data 60, and/or be trained on any other suitable information.

The risk prediction model 500 is preferably trained using the secondary training data 60 as training inputs and the respective secondary risk scores as training targets, but can be otherwise trained. The risk prediction model 500 can be trained using: backpropagation, differentiable optimization techniques (e.g., gradient descent based methods), nondifferentiable optimization techniques, and/or other techniques.

In a first variant, a single risk prediction model 500 instance is trained on multiple modalities. In a second variant, S570 includes training multiple sub-models, each specific to a different modality, wherein the sub-models are subsequently fused. In a third variant, S570 includes training multiple modality-specific sub-models, wherein the resultant risk scores are subsequently aggregated (e.g., averaged, voted, etc.). However, any number of risk prediction model instances can be trained.

However, training the risk prediction model S570 may be otherwise performed.

However, training the risk prediction model S500 may be otherwise performed.

However, determining a set of risk scores 20 for the scene S200 may be otherwise performed.

Figure 9:
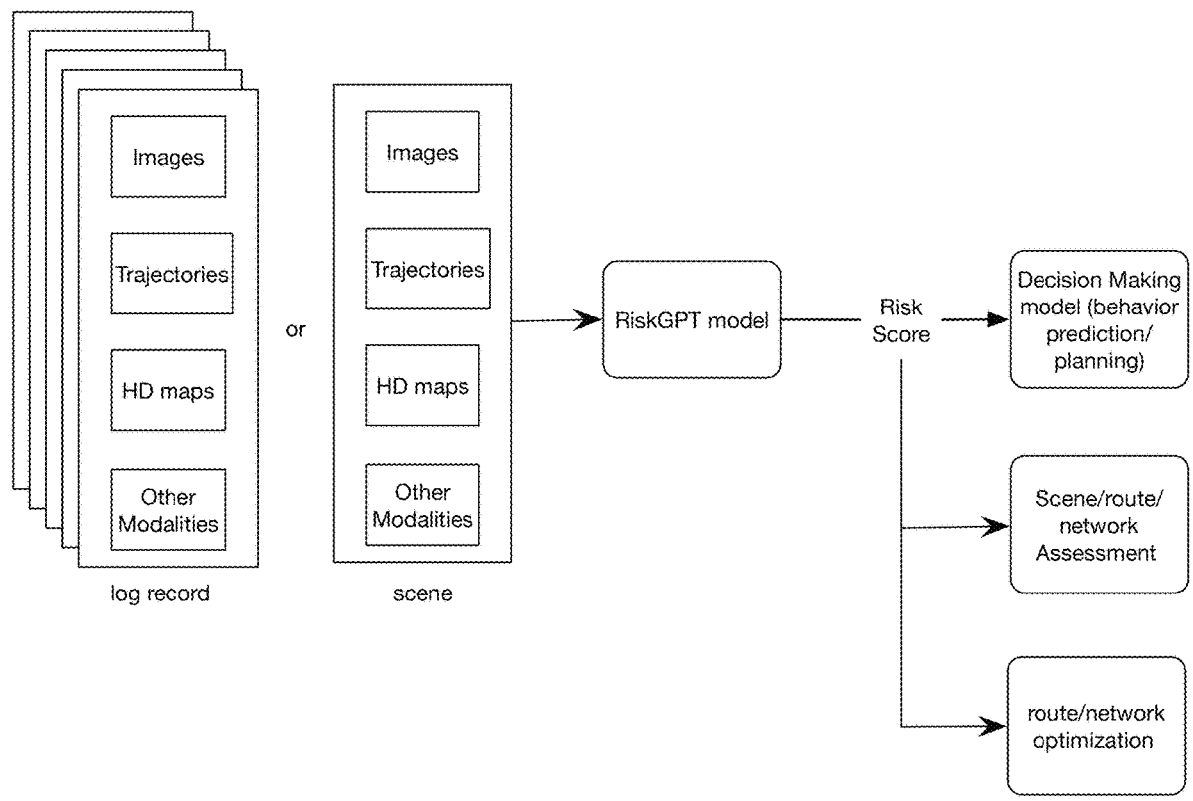
FIG. 9 is a schematic representation of an example of using the risk prediction model for risk assessment.

In variants, the set of risk scores can be used to determine an autonomous vehicle, assess a scene or vehicle route, optimize a scene or vehicle route, or otherwise used. An example is shown in FIG. 9.

Determining an autonomous vehicle behavior S300 functions to determine an autonomous vehicle's behavior based on the scene's determined set of risk scores 20.

Figure 7:
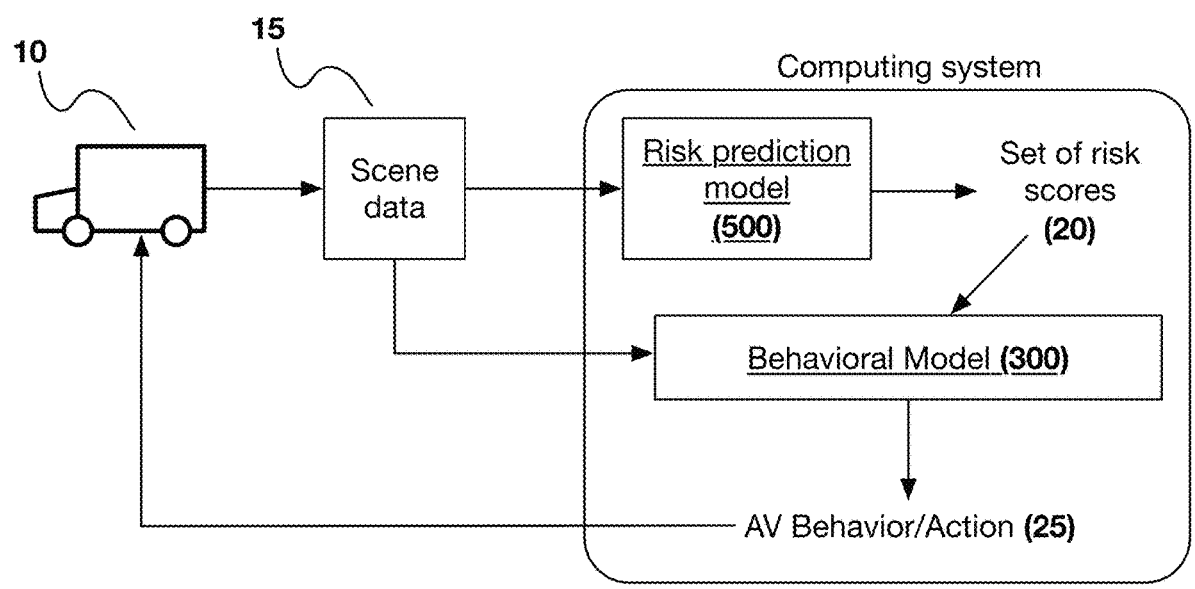
FIG. 7 is a schematic representation of an example of the system of determining a scene risk assessment and controlling an autonomous vehicle.

Determining an autonomous vehicle behavior S300 can be performed by a processing system onboard the vehicle, by a remote computing system, and/or by any other suitable system (e.g., example shown in FIG. 7). S300 can be performed after S200, independent of S200, and/or at any other suitable time. The AV behavior can be determined by predicting the behavior (e.g., from the scene data and/or set of risk scores), selecting the AV behavior (e.g., based on the set of risk scores, the scene data, AV intent, etc.), and/or otherwise determining the AV behavior.

The AV behavior can be determined using a behavior model 300. The behavior model 300 can be a neural network, DNN, MLP, transformer, large behavioral model, reinforcement learning model, lookup table, MPC controller, and/or any other suitable model. In an example, models that can be used include those disclosed in U.S. application Ser. No. 18/225,319 filed 24 Jul. 2023 or U.S. application Ser. No. 18/654,315 filed 3 May 2024, each incorporated herein in their entireties by this reference. In variants, the behavior model 300 can be specific to a geolocation, wherein the behavior model is selected from a set of predetermined behavior models based on a geolocation of the AV.

S300 can determine behavior based on: the set of risk scores, scene data, route data, AV intent, and/or any other suitable data. The determined behavior can be an AV behavior or action 25, and/or be any other suitable behavior. The behavior can include target actions and/or behavioral attributes of autonomous vehicles. In examples, actions can include turning, changing lanes, stopping, accelerating, decelerating, and/or any other suitable actions. In examples, behavioral attributes can include speed, delay in actions, and/or any other suitable attributes.

The behavior can be for the next timestep, next N timesteps, Nth future timestep, and/or for any other suitable time frame.

Determining an autonomous vehicle behavior S300 can include providing the sensor data, the risk scores (e.g., determined based on the sensor data in S200), and optionally auxiliary data (e.g., location, weather, time of year, AV intent, etc.) to the behavior model 300, wherein the behavior model 300 determines (e.g., predicts) the behavior based on the input data. In variants, the behavior can be passed to a control module that generates lower-level actuator control instructions for the autonomous vehicle's actuators.

In a first variant, the risk scores are used to constrain or prune the set of candidate actions considered by the behavior model.

In a second variant, the risk scores are used as input weight within the behavioral model to prioritize candidate actions.

In a third variant, the risk scores trigger specific safety processes or override commands for critical situations.

In a fourth variant, the risk scores are provided to an input head of the behavior model, wherein the behavior model transforms the risk scores with the scene data. For example, the behavior model can embed the risk scores, together with the scene data, into a unified latent space (e.g., into a single embedding).

However, determining an autonomous vehicle behavior S300 may be otherwise performed.

Controlling the autonomous vehicle S400 functions to move the autonomous vehicle 10 within the scene in a risk-aware manner.

Controlling the autonomous vehicle S400 can be performed by the onboard processing system performing S200 and/or S300, but can alternatively be performed by a different processing system.

Controlling the autonomous vehicle S400 can be performed after S200, after S300, after a scene is assessed for risks, while the scene is assessed for risks, when an action is determined, when a behavioral attribute is determined, and/or at any other suitable time.

Controlling the autonomous vehicle S400 can include operating the vehicle (e.g. accelerating, decelerating, stopping, turning, proceeding, signaling, changing route or trajectory, etc.), controlling the vehicle actuators (e.g., motor controllers, braking systems, steering mechanism) according to a set of control instructions (e.g., generated based on the determined behavior), and/or any other suitable control actions.

In a first variant, the autonomous vehicle can be controlled as disclosed in U.S. application Ser. No. 18/225,319 filed 24 Jul. 2023, incorporated herein in its entirety by this reference.

In a second variant, the autonomous vehicle can be controlled as disclosed in U.S. application Ser. No. 18/654,315 filed 3 May 2024, incorporated herein in its entirety by this reference.

However, controlling the autonomous vehicle S400 may be otherwise performed.

Specific example 1 can include a method comprising: receiving a set of scene data for a real-world scene; determining a risk score for the scene, based on the set of scene data, using a risk prediction model, wherein the risk prediction model was trained by: determining a set of initial risk scores for each of a set of initial training data using numerical methods, based on a set of scene features extracted from the respective initial training data; learning a differentiable model using the set of initial training data and the respective set of initial risk scores; determining a plurality of multimodal datasets; determining a set of secondary risk scores for each multimodal dataset of the plurality of multimodal datasets using the differentiable model; and training a risk prediction model to predict the set of secondary risk scores for each multimodal dataset based on data from the respective multimodal dataset; determining a behavior based on the risk score for the scene using a behavior model; and controlling an autonomous vehicle (AV) according to the behavior. In variants of this specific example, determining a set of initial risk scores for each of a set of initial training data can comprise: extracting the set of scene features from the initial training data; computing a feature risk score for each of the set of scene features using a set of risk models; and computing the set of initial risk scores based on the feature risk scores for each of the set of scene features. In variants of this specific example, the set of risk models can comprise physics-based models. In variants of this specific example, the set of scene features can comprise static scene elements and dynamic scene elements In variants of this specific example, the feature risk scores are computed using a risk model specific to the scene feature. In variants of this specific example, the differentiable model does not can comprise a set of self-attention layers, and wherein the risk prediction model can comprise a set of self-attention layers. In variants of this specific example, determining the risk prediction model can comprise a transformer architecture. In variants of this specific example, the plurality of multimodal datasets can comprise more data modalities than the set of initial training data. In variants of this specific example, each risk prediction model is specific to the real-world scene. In variants of this specific example, the real-world scene is associated with a geolocation, wherein the risk prediction model is specific to the geolocation. In variants of this specific example, the behavior model is associated with the geolocation. In variants of this specific example, the set of secondary risk scores can comprise a set of feature-specific risk scores. The set of secondary risk scores can comprise a total scene risk score determined from the set of feature-specific risk scores. In variants of this specific example, the set of secondary risk scores can comprise a set of modality-specific risk scores.

Specific example 2 can include a system comprising: a non-transitory computer-readable medium; a processing system coupled to the non-transitory computer-readable medium, wherein the processing system is configured to: receive a set of scene data for a real-world scene; determine a risk prediction from the set of scene data using a risk prediction model, wherein the risk prediction model was trained by: determining a set of initial risk scores for each of a set of initial training data using numerical methods, based on a set of scene features extracted from the respective initial training data, learning a differentiable model using the set of initial training data and the respective set of initial risk scores, determining a plurality of multimodal datasets, determining a set of secondary risk scores for each multimodal dataset of the plurality of multimodal datasets using the differentiable model, and training a risk prediction model to predict the set of secondary risk scores for each multimodal dataset based on data from the respective multimodal dataset; and determine an autonomous vehicle behavior using the risk prediction. In variants of this specific example, determining a set of initial risk scores for each of a set of initial training data can comprise: extracting the set of scene features from the initial training data; computing a feature risk score for each of the set of scene features using a set of risk models; and computing the set of initial risk scores based on the feature risk scores for each of the set of scene features. In variants of this specific example, the set of risk models can comprise physics-based models. In variants of this specific example, each scene feature is associated with a feature type, wherein the set of initial risk scores for a feature is computed using a risk model specific to the feature type. In variants of this specific example, the differentiable model does not can comprise a set of self-attention layers, and wherein the risk prediction model can comprise a set of self-attention layers. In variants of this specific example, the multimodal dataset further can comprise a set of data, wherein each data is characterized by a modality, wherein the set of secondary risk scores for a multimodal dataset can comprise an aggregate risk score determined from a risk score for each modality of data within the multimodal dataset.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:
1. A method comprising:
receiving a set of scene data for a real-world scene;
determining a risk score for the scene, based on the set of scene data, using a risk prediction model, wherein the risk prediction model was trained by:

determining a set of initial risk scores for each of a set of initial training data using a non-differentiable model comprising a set of weights and a set of nonlinear scene-feature-specific risk models, based on a set of scene features extracted from the respective initial training data;

learning a differentiable model using the set of initial training data and the respective set of initial risk scores;

determining a plurality of multimodal datasets;

determining a set of secondary risk scores for each multimodal dataset of the plurality of multimodal datasets using the differentiable model; and training a risk prediction model to predict the set of secondary risk scores for each multimodal dataset based on data from the respective multimodal dataset;

determining a behavior based on the risk score for the scene using a behavior model;

controlling an autonomous vehicle (AV) according to the behavior.

2. The method of claim 1, wherein determining a set of initial risk scores for each of a set of initial training data comprises:

extracting the set of scene features from the initial training data;

computing a feature risk score for each of the set of scene features using the set of nonlinear scene-feature-specific risk models; and computing the set of initial risk scores based on the feature risk scores for each of the set of scene features.

3. The method of claim 2, wherein the set of nonlinear scene-feature-specific risk models comprise physics-based models.

4. The method of claim 2, wherein the set of scene features comprise static scene elements and dynamic scene elements.

5. The method of claim 1, wherein the differentiable model does not comprise a set of self-attention layers, and wherein the risk prediction model comprises a set of self-attention layers.

6. The method of claim 1, wherein determining the risk prediction model comprises a transformer architecture.

7. The method of claim 1, wherein the plurality of multimodal datasets comprise more data modalities than the set of initial training data.

8. The method of claim 1, wherein each risk prediction model is specific to the real-world scene.

9. The method of claim 8, wherein the real-world scene is associated with a geolocation, wherein the risk prediction model is specific to the geolocation.

10. The method of claim 9, wherein the behavior model is associated with the geolocation.

11. The method of claim 1, wherein the set of secondary risk scores comprises a set of feature-specific risk scores.

12. The method of claim 11, wherein the set of secondary risk scores comprises a total scene risk score determined from the set of feature-specific risk scores.

13. The method of claim 1, wherein the set of secondary risk scores comprises a set of modality-specific risk scores.

14. A system comprising:
a non-transitory computer-readable medium;
a processing system coupled to the non-transitory computer-readable medium, wherein the processing system is configured to:

receive a set of scene data for a real-world scene;

determine a risk prediction from the set of scene data using a risk prediction model, wherein the risk prediction model was trained by:

determining a set of initial risk scores for each of a set of initial training data using a set of non-differentiable models, based on a set of scene features extracted from the respective initial training data;

learning a differentiable model using the set of initial training data and the respective set of initial risk scores;

determining a plurality of multimodal datasets;

determining a set of secondary risk scores for each multimodal dataset of the plurality of multimodal datasets using the differentiable model; and training a risk prediction model to predict the set of secondary risk scores for each multimodal dataset based on data from the respective multimodal dataset; and determine an autonomous vehicle behavior using the risk prediction.

15. The system of claim 14, wherein determining a set of initial risk scores for each of a set of initial training data comprises:

extracting the set of scene features from the initial training data;

computing a feature risk score for each of the set of scene features using the set of non-differentiable models, wherein the set of non-differentiable models comprise a set of nonlinear risk models; and computing the set of initial risk scores based on the feature risk scores for each of the set of scene features.

16. The system of claim 15, wherein the feature risk scores are computed using a nonlinear risk model specific to the scene feature.

17. The system of claim 15, wherein the set of nonlinear risk models comprise physics-based models.

18. The system of claim 15, wherein each scene feature is associated with a feature type, wherein the set of initial risk scores for a feature is computed using a risk model specific to the feature type.

19. The system of claim 14, wherein the differentiable model does not comprise a set of self-attention layers, and wherein the risk prediction model comprises a set of self-attention layers.

20. The system of claim 14, wherein the multimodal dataset further comprises a set of data, wherein each data is characterized by a modality, wherein the set of secondary risk scores for a multimodal dataset comprises an aggregate risk score determined from a risk score for each modality of data within the multimodal dataset.

* * * * *